United States Patent [19]

Haskell et al.

[11] Patent Number: 5,159,447
[45] Date of Patent: Oct. 27, 1992

[54] BUFFER CONTROL FOR VARIABLE BIT-RATE CHANNEL

[75] Inventors: Barin G. Haskell, Tinton Falls; Amy R. Reibman, East Windsor, both of N.J.

[73] Assignee: AT&T Bell Laboratories, Murray Hill, N.J.

[21] Appl. No.: 704,551

[22] Filed: May 23, 1991

[51] Int. Cl.⁵ .......................... H04N 7/12; H04N 7/13
[52] U.S. Cl. .................................... 358/133; 358/135; 358/136; 375/26; 375/27
[58] Field of Search ............... 358/133, 135, 136, 105, 358/141, 142, 12; 375/27, 28, 26; 370/84, 85.7, 95.1

[56] References Cited

U.S. PATENT DOCUMENTS

| | | | |
|---|---|---|---|
| 4,706,260 | 11/1987 | Fedele et al. | 358/133 |
| 4,706,265 | 11/1987 | Furukawa | 358/133 |
| 4,829,376 | 5/1989 | Hammer | 358/133 |
| 4,933,762 | 6/1990 | Guichard et al. | 358/136 |
| 5,038,209 | 8/1991 | Hang | 358/136 |
| 5,073,821 | 12/1991 | Juri | 358/133 |

Primary Examiner—James J. Groody
Assistant Examiner—Michael H. Lee
Attorney, Agent, or Firm—T. Stafford

[57] ABSTRACT

The problems of buffer overflow and underflow encountered when employing actually variable or effectively variable bit-rate channels for communicating encoded video images are overcome by jointly controlling the number of bits employed to encode each video frame and the transmission bit-rate of the variable bit-rate channel as experience by the encoder. The selection of the number of bits employed to encode each video frame, and hence the encoder bit-rate, as well as the associated channel bit-rate are determined from the encoder buffer fullness, a determination of the decoder buffer fullness and any constraint imposed on the channel. The encoder is responsive to the selected encoder bit-rate and accordingly adjusts its encoding parameters so as to achieve the selected encoder bit-rate.

6 Claims, 8 Drawing Sheets

BUFFER CONTROL FOR VARIABLE BIT-RATE CHANNEL

TECHNICAL FIELD

This invention is related to video image processing and, more particularly, to avoiding encoder and decoder buffer overflow and underflow when the image is transmitted over a variable bit-rate channel.

BACKGROUND OF THE INVENTION

Transform coding techniques and other systems for compressing video motion pictures are well known. One such video coding system is defined in the CCITT recommendation H.261 (Px64kbps standard). In the prior known systems, compressed video data is transmitted via channels having a constant bit-rate. An encoder buffer is an essential element of this type of video coding system. The encoder buffer is used to translate the variable bit-rate signal supplied by an encoder to a constant bit-rate signal for transmission. The encoder buffer stores the encoded information supplied to it in a first in, first out manner, typically prior to transmission. A buffer/quantizer controller is often employed to regulate the buffer fullness by specifying the quantity of information that can be supplied to the encoder buffer by the encoder.

It is important that the encoder buffer not be allowed to "overflow" or "underflow" data. Overflow of the encoder buffer causes data to be lost. Underflow of the buffer results in inefficient use of the transmission channel bandwidth. It is also important to avoid decoder buffer overflow or underflow. Decoder buffer overflow occurs when the rate at which information is arriving from the channel is greater than the rate at which the decoder can process the information. Decoder buffer underflow occurs when the decoder buffer is empty and the decoder must display a new frame but no new frame has been decoded. This can occur if the channel bit-rate is too slow.

For fixed rate transmission channels there are known control arrangements for preventing both encoder and decoder buffer overflow and underflow. However, such known control arrangements are ineffective when an actual variable bit-rate channel or an effectively variable bit-rate channel is employed to transmit the encoded video. One such actual variable bit-rate channel system is Broadband Integrated Services Digital Networks (B-ISDN). An effectively variable bit-rate channel may arise for a particular signal when encoded signals are transmitted or stored together in a multiplexed fashion, e.g., encoded video that is multiplexed with associated audio signals and other bits, such as control bits, to form a single stored multiplexed bit-stream on a video disk. The compressed video signal data, when extracted from the multiplexed bit-stream, typically becomes available in spurts such that the video data must be considered as arriving at a variable rate. This is true even when the multiplexed signal itself is being transmitted or recalled from storage at a constant bit-rate. The transmission bit-rate of such an effectively variable bit-rate channel is the rate that bits are removed from the encoder buffer associated with that channel.

A prior solution for preventing buffer overflow and underflow in a decoder when an effectively variable bit-rate channel is employed requires the use of an additional buffer memory for interfacing to the variable bit-rate channel. Use of such an additional buffer is undesirable because of cost and other limitations it imposes on system configuration.

SUMMARY OF THE INVENTION

The problems of buffer overflow and underflow encountered when employing actually variable or effectively variable bit-rate channels for communicating encoded video images are overcome, in accordance with an aspect of the invention, by jointly controlling the number of bits employed to encode each video frame and the transmission bit-rate of the variable bit-rate channel as experienced by the encoder. The selection of the number of bits employed to encode each video frame, and hence the encoder bit-rate, as well as the associated channel bit-rate are determined from the encoder buffer fullness, a determination of the decoder buffer fullness and any constraint imposed on the channel. The encoder is responsive to the selected encoder bit-rate and accordingly adjusts its encoding parameters so as to achieve the selected encoder bit-rate.

In a first preferred embodiment of the invention, a plurality of predicted channel bit-rates are developed for a current and future frames. Thereafter, a range of acceptable encoder bit-rates is determined for the current frame and the encoder supplies as an output an encoded version of the video image having a bit-rate that is within the acceptable range. In addition, in accordance with another aspect of the invention, the actual transmission bit-rate selected may be chosen to be less than the maximum bit-rate allowed by the channel at a particular instant of time.

In a second preferred embodiment, the effective channel bit-rate for a plurality of encoders is controlled by selecting the actual bit-rate employed by each encoder for encoding predetermined data units of bit-streams, i.e., access units, which are supplied thereto. In addition, the effective channel rate is controlled by determining the order in which each of encoded versions of the access units, which are supplied as an output by each encoder, will be transmitted. The encoder bit-rate for each encoder is controlled to prevent its associated encoder and decoder buffers from overflowing or underflowing. The bit-rate of each encoder is also controlled to ensure that each of such encoded versions of the access units from all the other encoders of the plurality can be transmitted so that none of their decoder buffers underflow.

BRIEF DESCRIPTION OF THE DRAWING

Shown in FIG. 1, in simplified block diagram form, is an exemplary video encoder unit incorporating aspects of the invention, a variable rate channel and an exemplary decoder unit.

Shown in FIG. 2 is an exemplary encoding system wherein a multiplicity of individual unencoded bit-streams are encoded and multiplexed into a single bit-stream, in accordance with an aspect of the invention.

Figure 1:
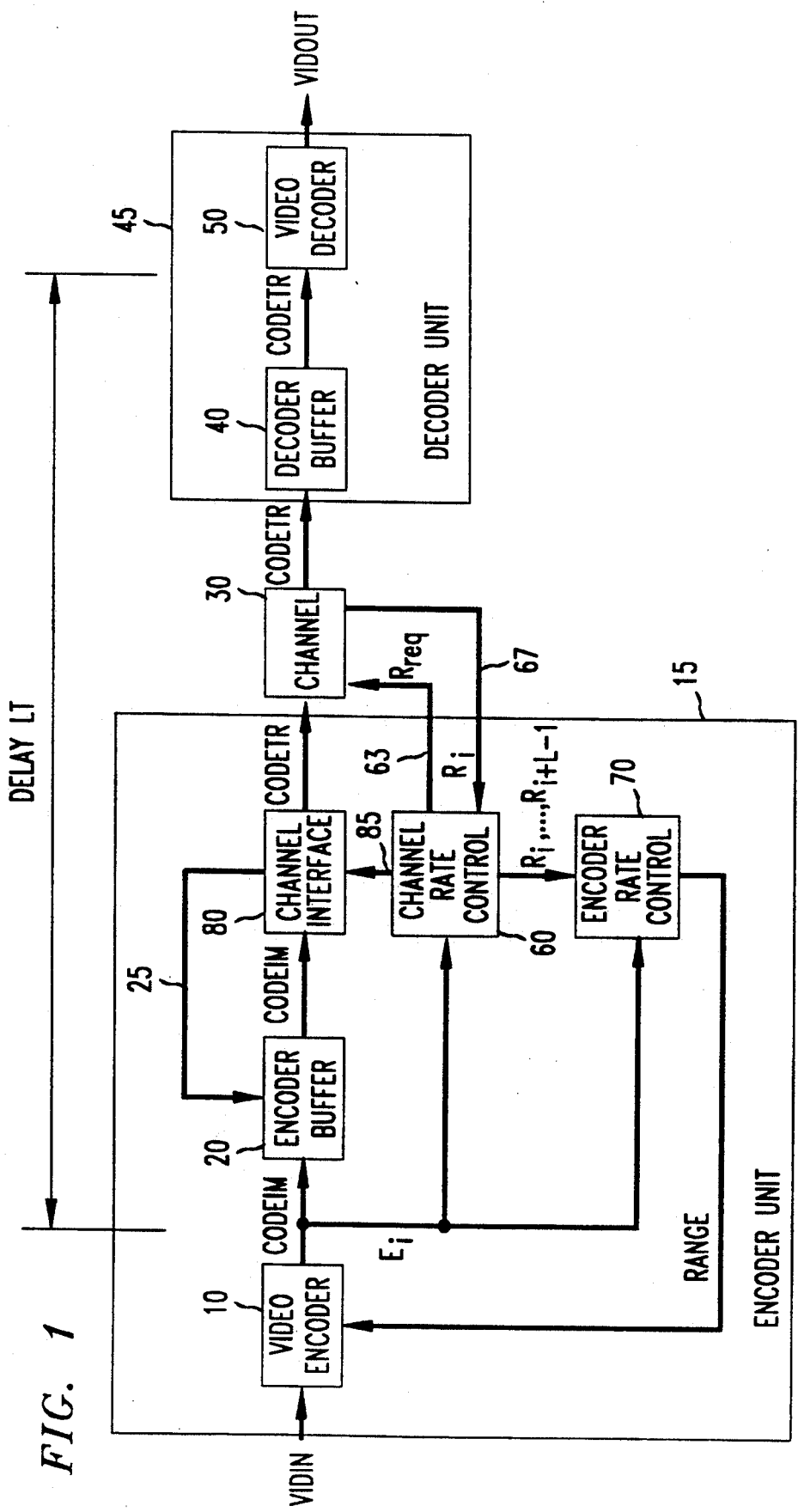
Figure 2:
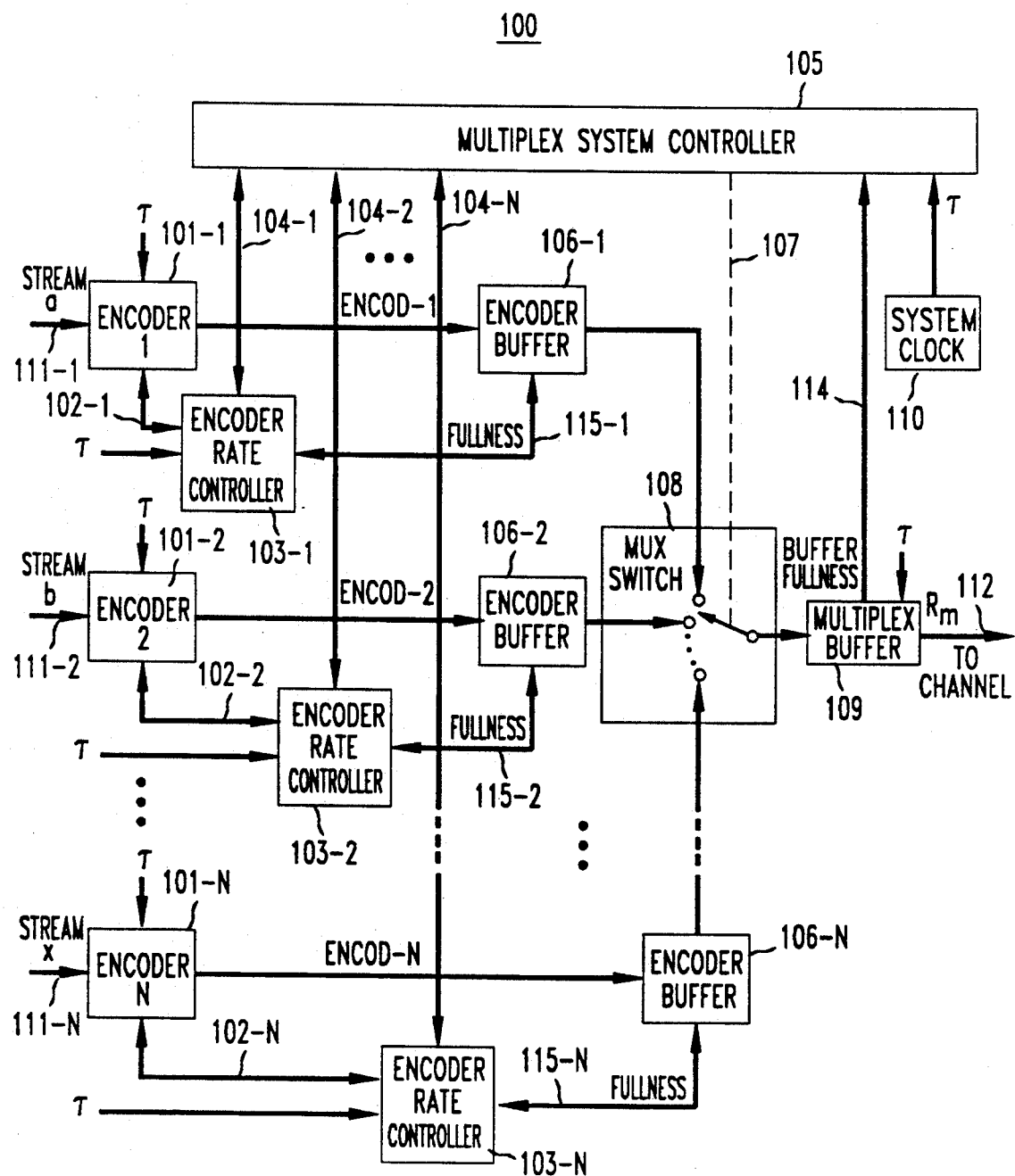
Figure 4:
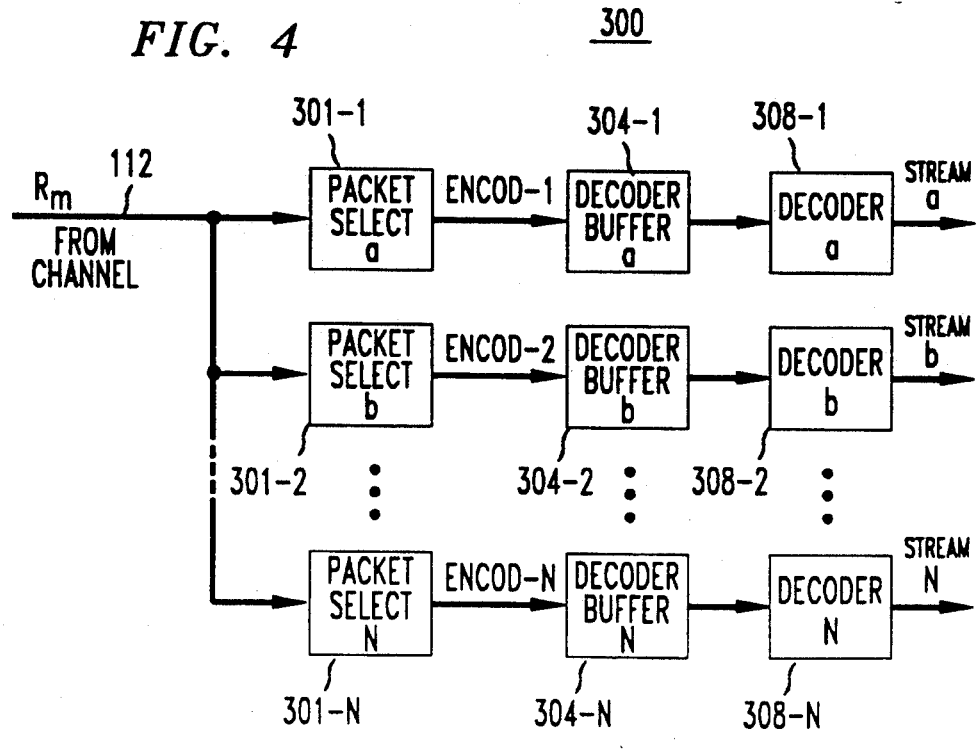
Figure 5:
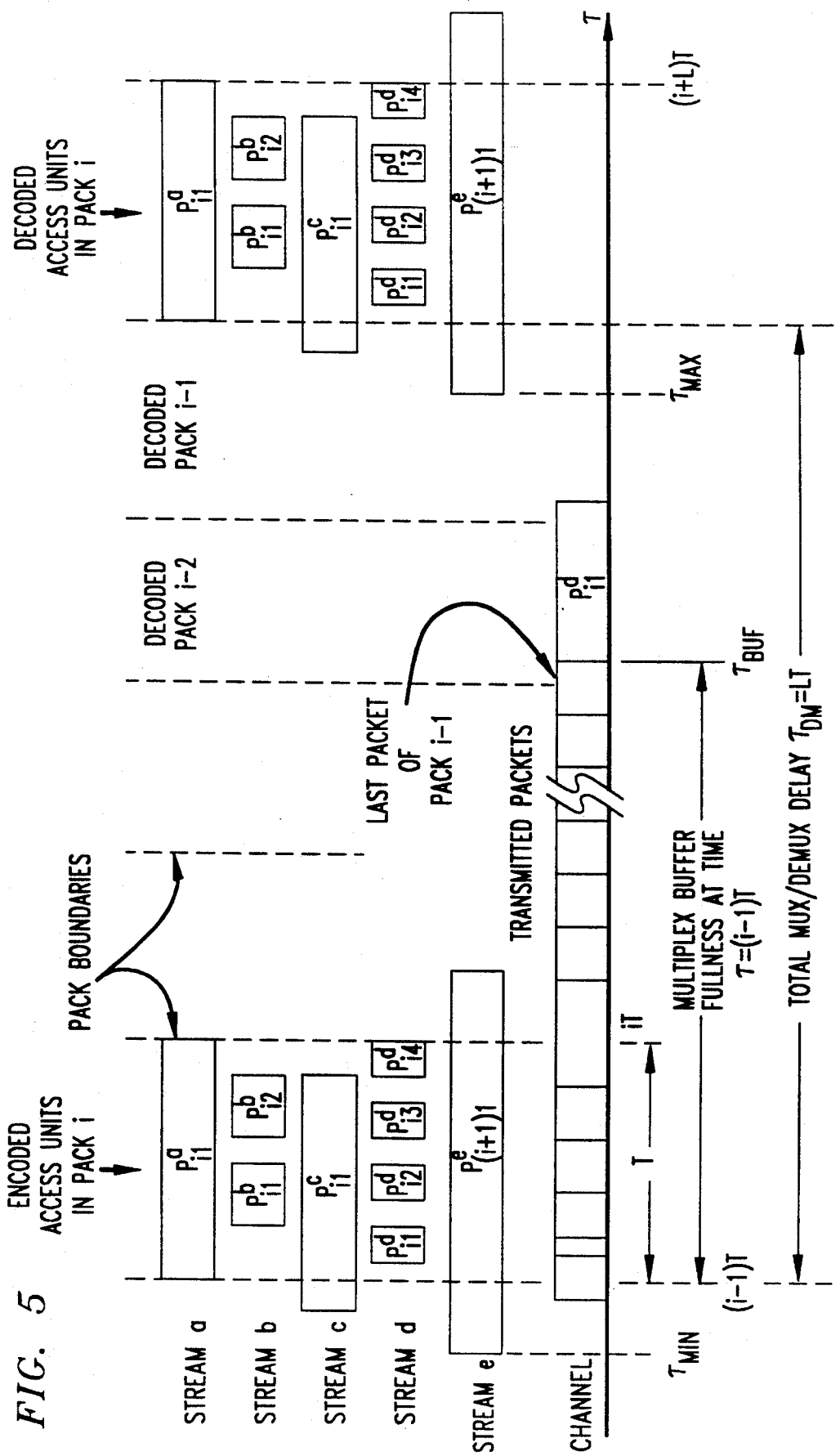
Figure 6:
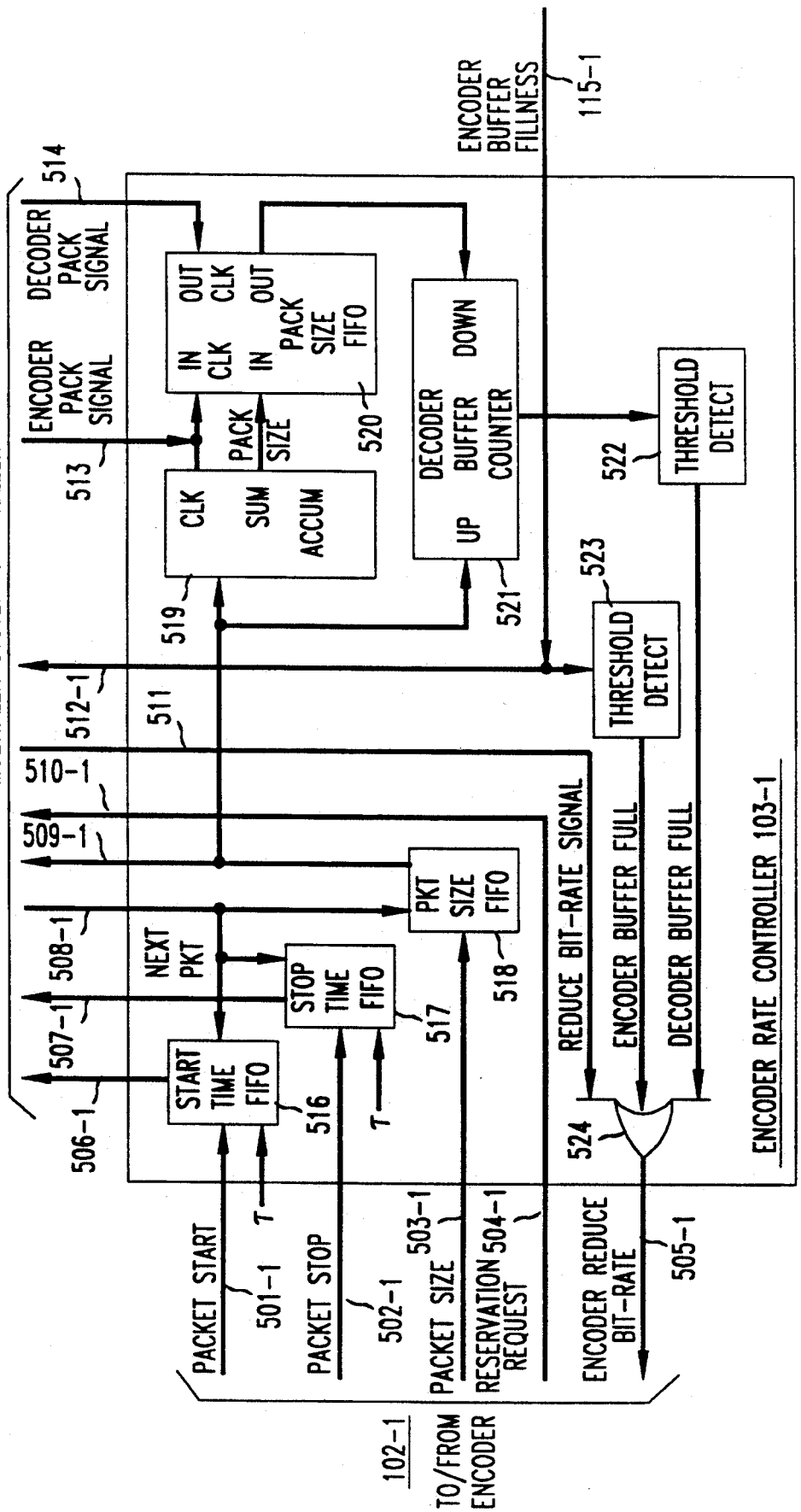
Figure 7:
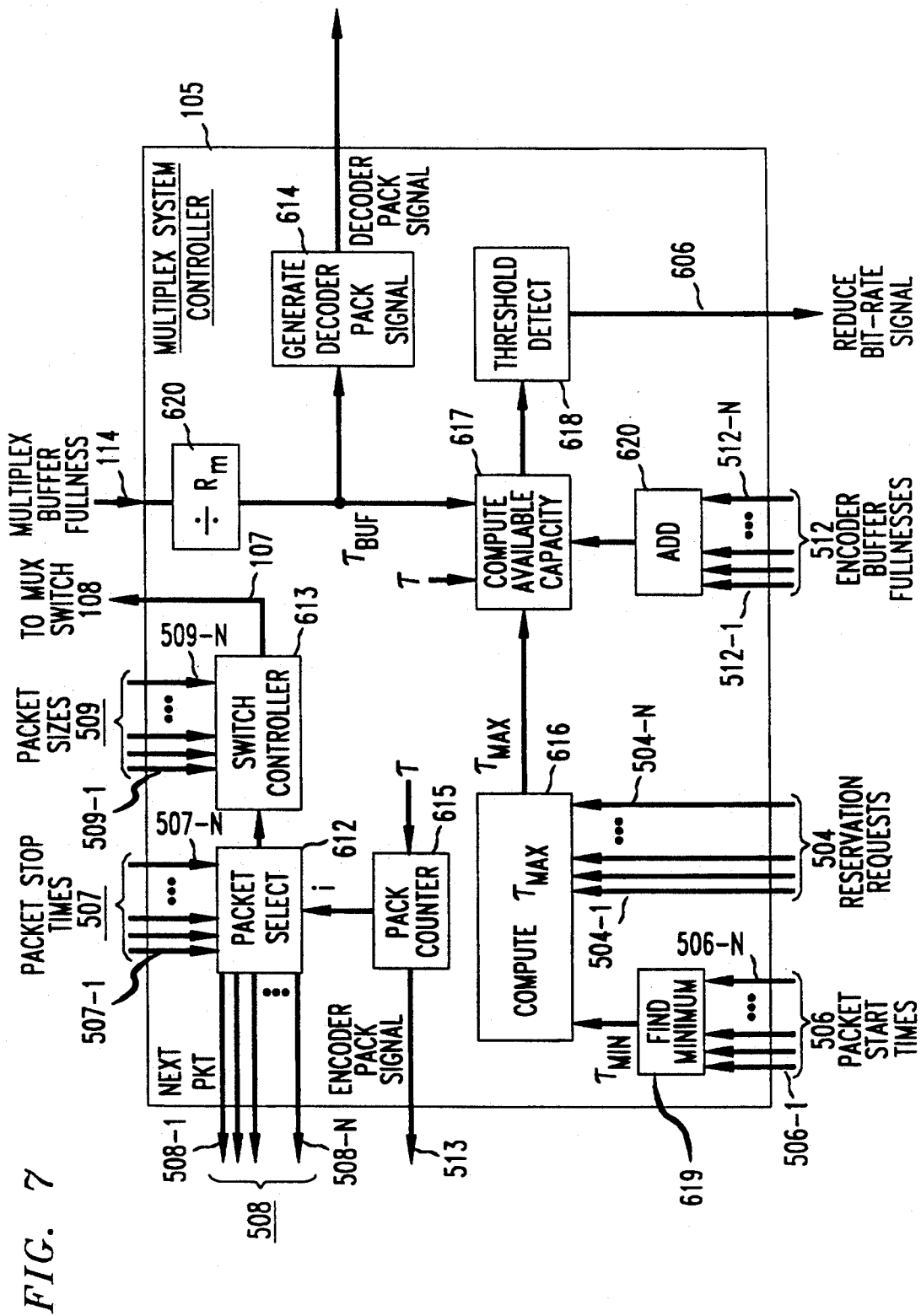
Figure 8:
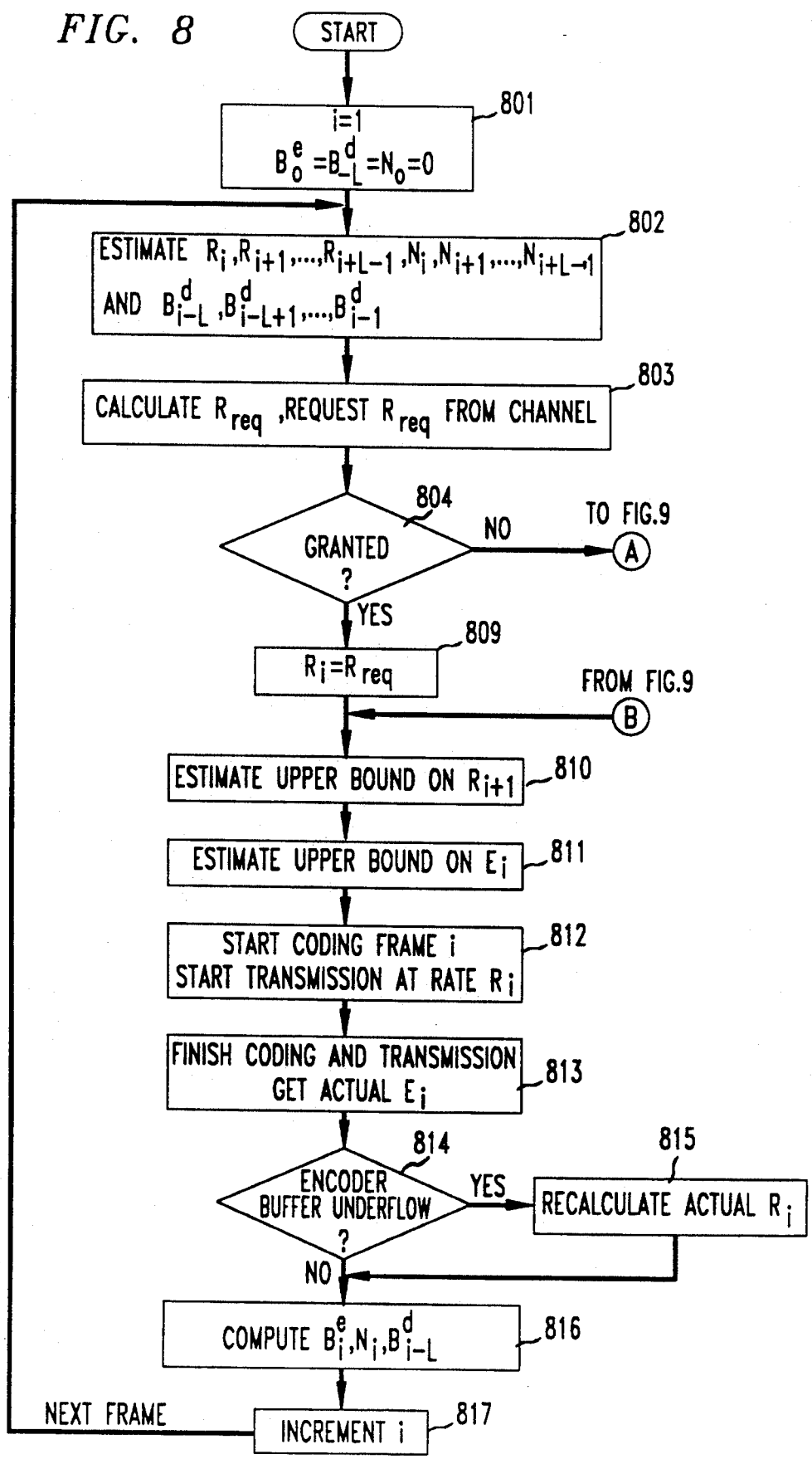
Figure 9:
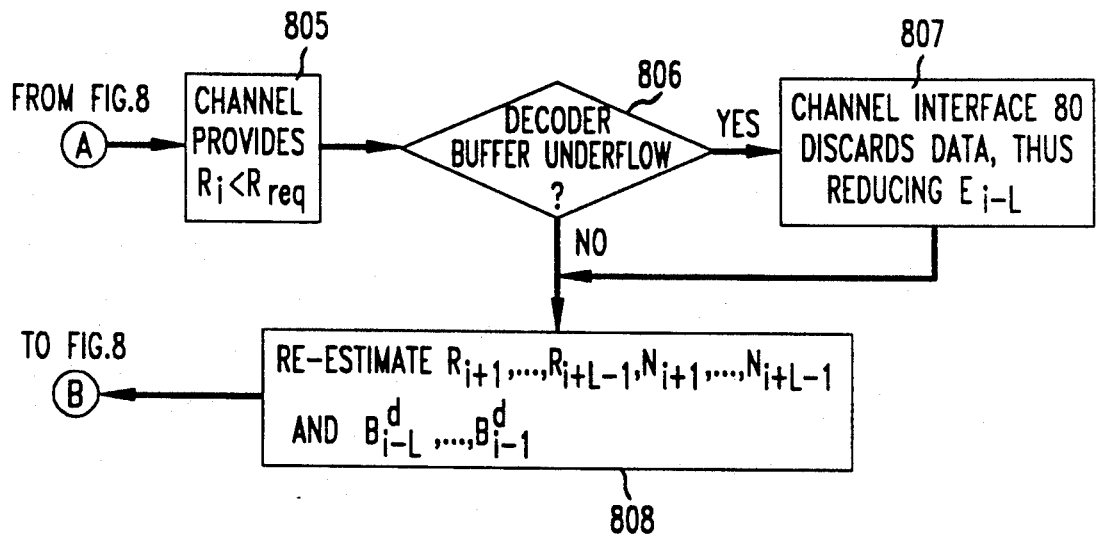
Figure 10:
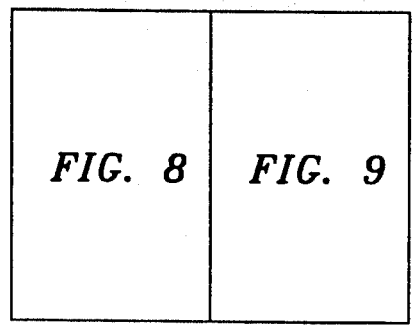

An alternative exemplary embodiment of a demultiplexer and decoder is depicted in FIG. 4;

FIG. 5 shows an exemplary system timing diagram for the multiplexing operation of the exemplary encoding system shown in FIG. 2;

Shown in FIG. 6 is a more detailed view of an exemplary encoder rate controller shown in FIG. 2;

FIG. 7 depicts, in simplified block diagram form, a detailed view of a multiplex system controller shown in FIG. 2; and FIGS. 8 and 9 when interconnected as shown in FIG. 10 illustrate the principles of buffer control for an exemplary encoder unit shown in FIG. 1 when an effectively variable rate channel is constrained by a leaky bucket rate constraint.

DETAILED DESCRIPTION

Shown in FIG. 1, in simplified block diagram form, is exemplary video encoder unit 15, variable bit-rate (rate) channel 30 and exemplary decoder unit 45 incorporating aspects of the invention. An original video signal, VIDIN, that includes frames which contain at least one image representation, is supplied as an input to video encoder 10. Such video signals are well known in the art. Video encoder 10 produces bit-stream CODEIM, comprising frames, which contains a first encoded version of signal VIDIN. Each frame of bit-stream CODEIM contains an encoded version of the signals representing the images of a frame of signal VIDIN. Video encoders and methods employed to encode video signals are well known. Bit-stream CODEIM is stored in encoder buffer 20 from which it is supplied in a first in, first out (FIFO) fashion to channel interface 80. Channel interface 80 removes from bit-stream CODEIM a predetermined number of bits, which may be zero, and supplies as an output the resulting second encoded version of signal VIDIN as bit-stream CODETR. Methods of arranging encoded video signals so that bits may be removed are well known. Thereafter, bit-stream CODETR is transmitted across variable rate channel 30 to decoder buffer 40.

The number of bits to be removed from each frame of bit-stream CODEIM so as to produce bit-stream CODETR is determined by the difference between the actual bit-rate $R_i$ made available by variable rate channel 30 for transmitting the particular frame and a predicted value for that bit-rate, $R_{req}$ which is requested from channel 30 via link 63 and that is expected to be available for transmitting the particular frame. Only if $R_i < R_{req}$ are any of the bits discarded. Such discarding of bits is to be regarded as an emergency measure that is to be undertaken only in the case of severe and unpredictable congestion of variable rate channel 30. It is a purpose of the invention to avoid any discarding of bits and any resulting loss of information. Therefore, in accordance with an aspect of the invention, control over the number of bits produced is exerted by video encoder 10.

In some implementations, variable rate channel 30 itself might perform the removal of the bits, so that its output may not equal its input. In such implementations, channel interface 80 may only mark bits for deletion and the actual deletion of some or all bits is performed by channel 30 if it determines that the requested bit-rate cannot be made available. Alternatively, channel interface 80 may not be required and variable rate channel 30 can determine on its own which bits should be dropped from the format of bit-stream CODEIM.

The bit-rate $R_i$ actually made available by variable rate channel 30 for a particular frame, where i is a frame index, is communicated to channel rate control 60 via link 67. Channel rate control 60, in turn, communicates the actual bit-rate to channel interface 80 via link 85. The predicted bit-rate is also supplied via link 85 to channel interface 80 which employs link 25 to retrieve from encoder buffer 20 bit-stream CODEIM at the requested rate $R_{req}$. It is noted that the term link, as employed herein, can be any form of communication interconnection apparatus, including, without limitation, serial transmission, parallel bus and shared memory. On occasion, encoder buffer 20 may become empty, whereupon channel interface 80 immediately terminates transmission. In most cases, this will cause a reduction of $R_i$.

The bit-rates that can be supplied by variable rate channel 30 are not random, but are constrained in accordance with a predetermined function. Such channel constraint functions are well known, e.g., the leaky bucket function. Because of the constrained nature of variable rate channel 30, the granting of a particular requested bit-rate $R_{req}$ can serve to impose limitations on the bit-rate that may be available to variable rate channel 30 for the granting of future requests. It is also noted that variable rate channel 30 may include a delay. For example, variable rate channel 30 may be a video disk system.

After transiting across variable rate channel 30, bit-stream CODETR is temporarily stored in decoder buffer 40. Bit-stream CODETR is supplied as an input to video decoder 50 from decoder buffer 40, in a first in, first out fashion. Video decoder 50 supplies as an output video signal VIDOUT, a reconstructed version of original video signal VIDIN. Video decoders and the techniques employed therein are well known in the art.

The entire process from the initial supplying as an output of a frame of encoded bit-stream CODEIM from encoder buffer 20 until the corresponding version of that frame in CODETR which is received by decoder buffer 40 is supplied to video decoder 50 takes LT seconds, exclusive of any delay in variable rate channel 30. This time period of LT seconds, where T is the time period of one unencoded video frame and L is a system delay parameter not less than one (1) and not necessarily an integer, is arbitrarily selected by the implementor. After the first bit of bit-stream CODETR is received by decoder buffer 40, exactly LT seconds are waited by decoder buffer 40 before it delivers the first frame to video decoder 50. For clarity of exposition, the embodiments of the invention presented herein will be described as if L were an integer. Embodiments of the invention in which L is not an integer will be readily apparent to those skilled in the art.

Encoder buffer 20 and decoder buffer 40 each have predetermined fixed maximum sizes, $B_{max}^e$ and $B_{max}^d$ respectively, which are known to video encoder 10, channel rate control 60 and encoder rate control 70 a priori. In addition, the value of the delay factor L is known a priori by video encoder 10, channel rate control 60, encoder rate control 70 and decoder buffer 40.

Any method of encoding images that allows the number of bits produced as the encoded representation of each image to be specified may be employed by video encoder 10. Such methods are well known in the art. Encoder rate control unit 70 supplies to video encoder 10 signal RANGE. Signal RANGE is a representation of the range of acceptable numbers of bits that may be produced when encoding each frame of original video signal VIDIN into bit-stream CODEIM. In accordance with an aspect of the invention, the range constraining the number of bits that video encoder 10 may produce, is determined so that neither encoder buffer 20 nor decoder buffer 40 will overflow or underflow. The method of determining this range will be described below. Video encoder 10 encodes each frame of signal VIDIN and thereby produces a portion of bit-stream CODEIM that represents frame i and actually contains $E_i$ bits in a frame period $[(i-1)T, iT]$. $E_i$ is a number that falls within the range given by the encoder rate control unit 70 in signal RANGE for frame i. The frame number index i designates each frame with respect to a predetermined starting frame. The $E_i$ bits, which are a portion of bit-stream CODEIM, are supplied as an input to encoder buffer 20 and stored therein until it is time for them to be transmitted.

A selection of a set of estimated channel bit-rates $R_i$, $R_{i+1}, \ldots, R_{i+L-1}$ by channel rate control unit 60, in accordance with an aspect of the invention, is controlled by the need to prevent encoder buffer 20 and decoder buffer 40 from overflowing or underflowing. This selection is also controlled by the bit-rate constraint on variable rate channel 30, in accordance with an aspect of the invention. This bit-rate constraint on variable rate channel 30 may be time-varying. Additional factors that may be considered in the selection of the estimated channel bit-rates are the cost of transmitting each bit and the fact that for some channel constraints (for example, the well known leaky bucket constraint) the channel bit-rate could be conserved at an earlier time so as to produce a less stringent channel rate constraint later. This might be desirable if a frame of original video signal VIDIN that has been encoded using intraframe techniques will need to be transmitted soon.

Channel rate control 60 supplies as an input the current estimated value of $R_i$ to variable rate channel 30 as a request for bit-rate $R_{req}$ on line 63. If variable rate channel 30 grants the request for bit-rate, the actual channel bit-rate $R_i$ equal to $R_{req}$ is returned on line 67. Otherwise, if variable rate channel 30 is unable to grant the request, the actual channel bit-rate granted $R_i$, which is less than $R_{req}$ is returned on line 67.

Encoder rate control unit 70 receives as inputs the actual rate $R_i$ granted by variable rate channel 30 and the estimated potential future channel bit-rate values for the next $L-1$ frames $R_{i+1}, \ldots, R_{i+L-1}$ that are selected, in a manner to be described, from channel rate control unit 60. Encoder rate control unit 70 also receives as an input the actual number of bits $E_i$ that are supplied as an output by video encoder 10 for each frame period i. The range for $E_i$ that is supplied as an output by encoder rate control unit 70 is determined, in a manner to be described, such that neither encoder buffer 20 nor decoder buffer 40 will overflow or underflow.

Channel rate control unit 60 also receives as an input the actual current channel bit-rate $R_i$ from channel 30 via link 67 and the number of bits $E_i$ that are actually supplied by video encoder 10 as an output in the current frame period. An estimated channel bit-rate $R_{i+L}$, which describes the number of bits that are desired to be transmitted across channel 30 in the frame period L frames hence, is selected by channel rate control unit 60. Each of these selected channel bit-rates are, as noted above, supplied as an input to encoder rate control unit 70.

The following theoretical exposition should prove useful to one skilled in the art in the understanding of the detailed operation of channel rate control 60 and encoder rate control 70, particularly when variable rate channel 30 is constrained, in an exemplary fashion, by the leaky bucket constraint. E (t) is defined to be the number of bits (or bytes or packets) output by the encoder at time t. The instantaneous bit-rate at any given time of variable rate channel 30, R (t), is variable. $B^e(t)$ and $B^d(t)$ are the instantaneous fullnesses of encoder and decoder buffers 20 and 40, respectively. Encoder buffer 20 and decoder buffer 40 each have predetermined fixed maximum sizes, $B_{max}^e$ and $B_{max}^d$ respectively. Given $B_{max}^e$, encoder unit 15 is designed to ensure that encoder buffer 20 never overflows, i.e., $$0 \leq B^e(t) \leq B_{max}^e \forall_t. \tag{1}$$

Conditions which are required to be placed on rates $E_i$ and $R_i$ to ensure that decoder buffer 40 never overflows or underflows, i.e., $$0 \leq B^d(t) \leq B_{max}^d \forall_t, \tag{2}$$

are described herein.

The problem is made discrete by defining $E_i (i=1,2,\ldots)$ to be the number of bits in the interval $[(i-1)T, iT]$, where T is the duration of one unencoded frame of unencoded video signal VIDIN. Therefore, $$E_i = \int_{(i-1)T}^{iT} E(t) dt. \tag{3}$$

Similarly, $R_i$ is the number of bits that are transmitted over variable rate channel 30 during the ith frame period.

$$R_i = \int_{(i-1)T}^{iT} R(t) dt. \tag{4}$$

which is the actual rate granted by variable rate channel 30.

Encoder buffer 20 receives bits at rate E (t) from video encoder 10 and supplies as an output bits of encoded video bit-stream CODEIM at a rate R (t). Therefore, assuming that encoder buffer 20 and decoder buffer 40 are empty prior to start-up at time $t=0$ and given that $$B^e(t) = \int_0^t [E(s) - R(s)] ds, \tag{5}$$

the encoder buffer fullness after encoding frame i is $$B_i^e = B^e(iT) = \int_0^{iT} [E(s) - R(s)] ds. \tag{6}$$

This can be written explicitly as $$B_i^e = \sum_{j=1}^i E_j - \sum_{j=1}^i R_j \tag{7}$$

or recursively as $$B_i^e = B_{i-1}^e + E_i - R_i. \tag{8}$$

After decoder unit 45 begins to receive data in decoder buffer 40, it waits LT seconds before starting to decode, as described above. Again, it is assumes for clarity purposes that L is an integer, although this is not necessary.

A new time index $\tau$, is defined for decoder unit 45. $\tau$ is zero when decoding begins. Therefore, $$t = \tau + LT + \text{channel.delay} \quad (9)$$

where channel.delay is the transmission delay time across variable rate channel 30. Encoder unit 15 can calculate the initial fullness of decoder buffer 40, $B^d(0)$ (when $\tau=0$), if L is predetermined or transmitted explicitly as a parameter to decoder unit 45. The initial fullness of decoder buffer 40 is given by $$B_0^d = \sum_{j=1}^{L} R_j. \quad (10)$$

The fullness of decoder buffer 40 at time $\tau = iT$ can be determined by $$B_i^d = B_{i-1}^d + R_{L+i} - E_i. \quad (11)$$

or $$B_i^d = B_0^d + \sum_{j=1}^{i} R_{L+j} - \sum_{j=1}^{i} E_j. \quad (12)$$

For $(i-1)T \leq \tau \leq iT$, the fullness of decoder buffer 40 varies depending on the channel bit-rate R(t) and the rate at which video decoder 50 extracts data from decoder buffer 40. In particular, $$B_{i-1}^d - E_i \leq B^d(\tau) \leq B_i^d + E_i. \quad (13)$$

Conditions necessary to prevent underflow and overflow of encoder buffer 20 and decoder buffer 40 are presented for a general variable-rate channel. To prevent encoder buffer overflow and underflow, it is required from eq. (1) and eq. (8) that $$0 \leq B_{i-1}^e + E_i - R_i \leq B_{max}^e \quad (14)$$

or $$R_i - B_{i-1}^e \leq E_i \leq B_{max}^e + R_i - B_{i-1}^e \quad (15)$$

which represents a constraint on the number of bits $E_i$ that may be supplied for each encoded frame of bit-stream CODEIM for a given channel bit-rate $R_i$ granted by variable rate channel 30. For example, when variable rate channel 30 has a constant rate, encoder unit 15 can prevent encoder buffer 20 from overflowing or underflowing by varying the quality of the coding employed by video coder 10. If encoder unit 15 determines that encoder buffer 20 is approaching fullness, the bit-rate of bit-stream CODEIM being supplied as an input by video coder 10 to encoder buffer 20 is reduced. Such a reduction in the bit-rate of bit-stream CODEIM may be achieved by reducing the quality of the encoding performed by video coder 10. One method of reducing the encoding quality is to employ a coarser quantization step size. Such methods of reducing encoding quality are well known in the art. Conversely, if encoder buffer 20 threatens to underflow, video coder 10 can generate bit-stream CODEIM with a higher bit-rate, either by increasing the quality of encoding performed by video coder 10, or by supplying as an output stuffing bits that are consistent with the coding syntax and can be discarded by video decoder 50.

To prevent decoder buffer 40 from overflowing or underflowing the following constraints on the bit-rate of video coder 10 for a given channel bit-rate can be imposed:

$$0 \leq B_{i-1}^d - R_{i-L} - E_i \leq B_{max}^d \quad (16)$$

$$R_{i-L} + B_{i-1}^d \geq E_i \geq R_{i-L} + B_{i-1}^d - B_{max}^d.$$

Alternatively, the number of bits per frame can be unconstrained thereby yielding the following constraint on the channel bit-rate $R_i$:

$$E_i - B_{i-1}^d \leq R_{i+L} \leq E_i + (B_{max}^d - B_{i-1}^d)$$

which is the same as, for $i > L$ $$E_{i-L} - B_{i-L-1}^d \leq R_i \leq E_{i-L} + (B_{max}^d - B_{i-L-1}^d) \quad (17)$$

where $E_{i-L} - B_{i-L-1}^d \leq R_i$ specifies the condition in which underflow of decoder buffer 40 occurs and $$R_i \leq E_{i-L} + (B_{max}^d - B_{i-L-1}^d)$$

specifies the condition in which overflow of decoder buffer 40 occurs. Therefore, there is a restriction on the channel bit-rate $R_i$ that is dependent upon the output supplied by video encoder 10 L frames ago.

A counter indicating the fullness of an imaginary buffer is maintained by variable rate channel 30 when it is constrained by a leaky-bucket function. $R_i$ bits for frame period i are supplied as an input to the imaginary buffer (henceforth called the "bucket" herein). The rate at which bits are supplied as an output from the bucket is $\overline{R}$ bits per frame period. The bucket size is $N_{max}$. The instantaneous bucket fullness after frame i has been supplied to variable rate channel 30 is $$N_i = N_{i-1} + R_i - \overline{R} = \sum_{j=1}^{i} R_j - i\overline{R}. \quad (18)$$

To ensure that high-priority are not dropped by channel interface 80, the rate $R_i$ must be such that the bucket never overflows, i.e., $N_i \leq N_{max} \,\forall i$, or $$R_i \leq N_{max} - N_{i-1} + \overline{R} = N_{max} - \sum_{j=1}^{i-1} R_j + i\overline{R}. \quad (19)$$

Equation (19) defines the leaky-bucket constraint on the bit-rate that can be supplied as an input to variable rate channel 30.

However, the leaky-bucket constraint is not the only constraint. In fact, preventing overflow of decoder buffer 40 can impose a stronger constraint on the bit-rate that can be supplied as an input to variable rate channel 30. In particular, the right side of the decoder rate constraint specified in eq. (17) may be stricter than the leaky-bucket rate constraint of eq. (19).

The principles of buffer control for exemplary encoder unit 15 when variable rate channel 30 having a leaky bucket rate constraint are illustrated, in flow chart form, by FIGS. 8 and 9 when interconnected as shown in FIG. 10. Accordingly, the routine is entered via step 800 upon the arrival of the first frame of original video signal VIDIN. Step 801 performs variable initialization at time $t=0$ prior to encoding frame $i+1$. $B_i^e$ representing the fullness of encoder buffer 20 at time $t=iT$, $B_i^d$ representing the fullness of decoder buffer 40 at time $\tau = iT$, and $N_i$ representing the fullness of the leaky bucket at time $t = iT$ are all initialized to zero (0). In step 802, in accordance with an aspect of the invention, estimates of rates available from variable rate channel 30 for present frame i of original video signal VIDIN and for the next L future frames of original video signal VIDIN are determined. Also, in accordance with an aspect of the invention, leaky bucket fullnesses and fullnesses of decoder buffer 40 for the same next L future frames are estimated. For estimating channel bit-rates, inequalities eq. (17) and eq. (19) are employed, where for $k \leq 0$, $E_k = 0$. Leaky bucket fullnesses and fullnesses of decoder buffer 40 are determined from, respectively, eq. (18) and eq. (12). Rewriting them, for $j = i, i+1, \ldots, i+1-1$ yields $$E_{j-L} - B^d_{j-L-1} \leq R_j \leq E_{j-L} + (B^d_{max} - B^d_{j-L-1}) \quad (20)$$

where $E_{j-L} - B^d_{j-L-1} \geq R_j$ indicates an underflow condition for decoder buffer 40 and $$R_j \leq E_{j-L} + (B^d_{max} - B^d_{j-L-1})$$

indicates an overflow condition for decoder buffer 40, $$R_j \leq N_{max} - N_{j-1} + \overline{R} \quad (21)$$

$$N_j = N_{j-1} + R_j - \overline{R} \quad (22)$$

$$B_{j-L}^d = B_{j-L-1}^d + R_j - E_{j-L} \quad (23)$$

In most cases, in accordance with an aspect of the invention, for $j < i+L-1$ we can simplify and reuse previous estimates, in which case evaluations need be made only for $j = i+L-1$. However, as shown below, $B_{i-L-1}^d$ can change, and therefore reevaluation of all estimates can be desirable. In general, a value of $R_j \geq 0$ that is equal to whichever upper bound of eq. (20) and eq. (21) is smaller is a good choice. However, if it is know that a frame with a large number of bits is imminent, smaller values may be desirable. Smaller values of $R_j$ may be also be desirable if the channel were a video disk so as to employ as few bits as possible. When smaller values of $R_j$ are chosen, they are chosen to be larger than the lower bound of eq. (20) to prevent decoder buffer underflow.

For $i \leq L$, no frames are yet beinng decoded by video decoder 50, and decoder buffer 40 is merely filling. In general, the sum of $R_1, \ldots, R_L$ should be chosen to exceed the expected bit-rate of the first few frames of bit-stream CODEIM in order to avoid underflow of decoder buffer 40.

$R_{req}$ is set by channel rate control 60 to the estimated value for $R_i$ in step 803 and that rate is requested from variable rate channel 30. Thereafter, in accordance with an aspect of the invention, conditional branch point 804 tests to determine whether or not the requested channel bit-rate is granted. If the test result in step 804 is NO, thereby indicating that the requested channel bit-rate was not granted by variable rate channel 30, control is passed to step 805 which determines the actual value of $R_i$ that has been granted by variable rate channel 30. In step 806 channel rate control 60 tests to determine if underflow of decoder buffer 40 will occur by employing the actually granted channel bit-rate $R_i$. This determination is accomplished by evaluating the inequality of eq. (20) with $j = i$. If the test result in step 806 is YES, control is passed to step 807, in which channel rate control 60 causes channel interface 80 to discard bits from bit-stream CODEIM in a selective fashion to yield signal CODETR. Channel interface 80 attempts to minimize any deleterious effects on the image within the frame that might result, in order to reduce the value of $E_{i-L}$ so as to satisfy the inequality of eq. (20) and thereby avoid a catastrophic underflow of decoder buffer 40. Control is then passed to step 808. Also, if the test result in step 806 is NO, indicating that underflow of decoder buffer 40 will not occur, control is passed to step 808.

In step 808, channel rate control 60 re-computes the estimates of rates for variable rate channel 30 for the leaky bucket fullnesses and fullnesses of decoder buffer 40 for the next L future frames of original video signal VIDIN using the actual (smaller) value of $R_i$. These new estimates are derived in the same manner as the estimates derived in step 802. Control is then passed to step 810.

If the test result in step 804 is YES, thereby indicating that the requested channel bit-rate was granted by variable rate channel 30, control is passed to step 809 which assigns $R_i = R_{req}$. Thereafter, control is passed to step 810.

Step 810 estimates an upper bound (UB) on $R_{i+L}$ by using the leaky bucket constraint specified in eq. (21)

$$R_{i+L} \leq UBR_{i+L} = N_{max} - N_{i+L-1} + \overline{R} \quad (24)$$

In step 811 an upper bound on $E_i$ is determined by encoder rate control 70 in accordance with an aspect of the invention. This upper bound is determined by employing constraints on the overflow of encoder buffer 20 from inequality eq. (15) and underflow of decoder buffer 40 from inequality eq. (16)

$$E_i \leq B_{max}^e + R_i - B_{i-1}^e \quad (25)$$

$$E_i \leq UBR_{i+L} + B_{i-1}^d. \quad (26)$$

The minimum of these two upper bounds on $E_i$ is supplied as an output by encoder rate control 70 as signal RANGE to video encoder 10.

Step 812 begins encoding of frame i by video encoder 10 subject to the bounds on $E_i$ and the transmission of a frame from encoder buffer 20 at rate $R_i$. In step 813 the encoding of frame i by video encoder 10 and transmission through variable rate channel 30 of the frame supplied from encoder buffer 20 are completed. Video encoder 10 then supplies the actual value of $E_i$ as an input to channel rate control 60 and encoder rate control 70, in accordance with an aspect of the invention. The actual value of $E_i$ is used, in conditional branch point 814, to evaluate inequality eq. (14) and thereby determine if underflow of encoder buffer 20 occurred during the coding of frame i. If the test result in step 814 is NO, control is passed to step 816. If the test result in step 814 is YES, channel rate control 60 and channel interface 80 terminate transmission early, and control is passed to step 815 which calculates the new lower value of $R_i$ as $$R_i = B_{i-1}^e + E_i. \quad (27)$$

Thereafter, control is passed to step 816. Step 816 uses actual values of $E_i$ and $R_i$ to compute actual values of $B_i^e$, $N_i$ and $B_{i-L}^d$ using equations (8), (22) and (23), respectively. In step 817 i is incremented in preparation for encoding the next frame. If at this point, $R_i = R_{req}$ then all values previously estimated in step 2 are still valid, and for the next frame only an estimate for the latest time interval need be evaluated. If $R_i \neq R_{req}$, then $B_{i-L}{}^d$ has changed, and all values previously estimated in step 2 must be reevaluated.

Shown in FIG. 2 is exemplary encoding system 100 wherein a multiplicity of individual unencoded bit-streams 111-1 through 111-N are encoded and multiplexed into a single bit-stream 112 for transmission, in accordance with an aspect of the invention. Although the multiplexed bit-stream 112 is transmitted at constant rate $R_m$, the compressed versions of each bit stream, when extracted from the multiplexed signal, typically becomes available in spurts such that each bit stream is considered as if it is arriving from a channel having a variable rate. Therefore, each bit stream is transported over an effectively variable bit-rate channel. A key characteristic of such an effectively variable bit-rate channel is that the portion of the total channel bandwidth that will be available to any access stream at any time is not known. Each of individual unencoded bit-streams 111 may be derived from a different source. Typical sources from which individual unencoded bit-streams 111 may be derived include, without limitation: video, audio and data. For purposes of this example it is presumed that each of the parts of individual unencoded bit-streams 111 are associated together by virtue of having been generated during the same real time period. For example, unencoded bit-stream 111-1 could be a series of frames that show a person speaking, and unencoded bit-stream 111-2 could be a series of audio frames containing a digitized representation of what was spoken. Each of unencoded bit-streams 111 are encoded by encoders 101 into encoded signals ENCOD. Although not a limitation on the invention, for purposes of this example, it is also specifically required that parts of each of encoded signals ENCOD that were generated during the same time interval are associated together and combined, after encoding, into a predetermined portion of multiplexed stream 112 that corresponds to that time interval. This requirement facilitates editing of multiplexed stream 112. Thus, as described above, where video and audio are being multiplexed, each portion of multiplexed stream 112 would contain a video frame and digitized representation of what was spoken by the speaker during the time interval of that associated video frame.

Figure 3:
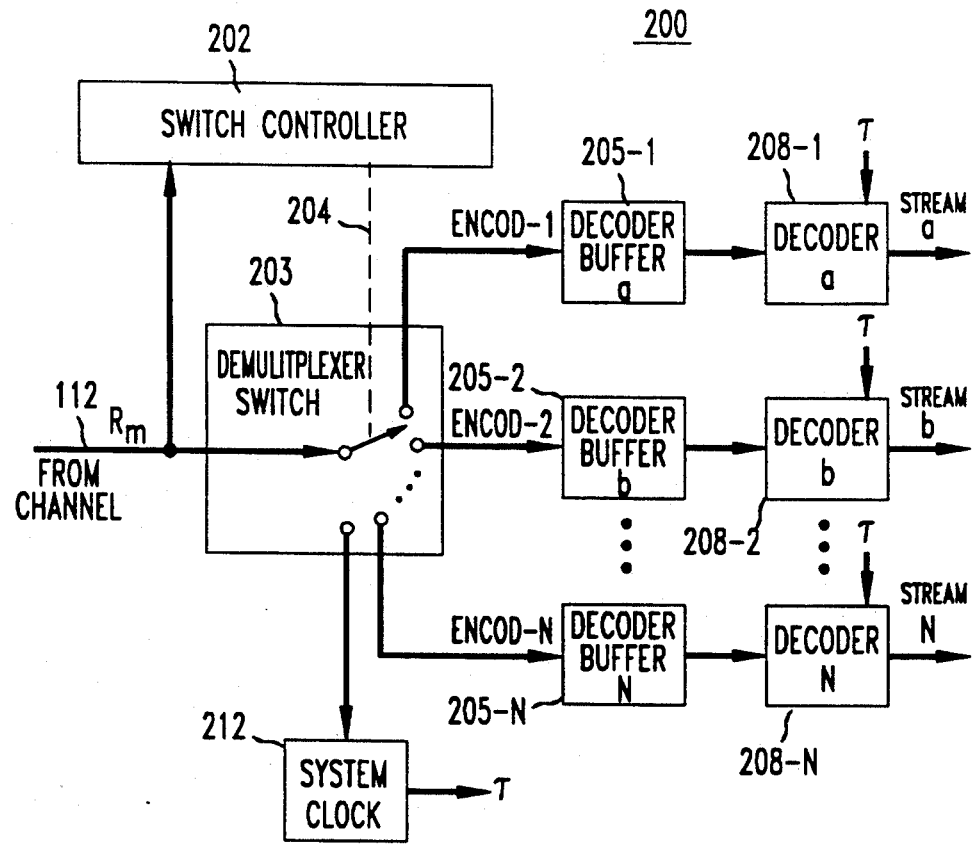
FIG. 3 shows a first exemplary embodiment of a demultiplexer and decoder.

For ease of implementation and clarity of exposition, it is presumed that in a demultiplexer and decoder system corresponding to exemplary encoding system 100, such as exemplary demultiplexer and decoder 200 shown in FIG. 3, each of individual encoded signals ENCOD (FIG. 2) has its own designated decoder and a corresponding decoder buffer, such as decoders 208 and decoder buffers 205. Further, as shown in FIGS. 3 and 4 (which shows another exemplary demultiplexer and decoder system) there is no buffering of multiplexed stream 112 prior to its demultiplexing back into each of individual encoded signals ENCOD, so that implementations may be developed that employ completely independent decoders. An advantage of such a system is that it permits easy intermixing of any number of video, audio, and other types of decoders into flexible configurations. Also, rate control can be provided for each of encoders 101 to prevent overflow and underflow of both encoder and decoder buffers.

As shown in FIG. 2, each of individual unencoded bit-streams 111-1 through 111-N are supplied as an input to one of encoders 101-1 through 101-N. For purposes of this example, unencoded bit-stream 111-1 is designated as a video signal and unencoded bit-stream 111-2 is designated as an audio signal. Each of encoders 101-1 through 101-N are adapted for encoding the type of information carried in the one of individual unencoded bit-streams 111 with which it is supplied and supplying as an output an encoded representation of the data carried therein as one of encoded bit-streams ENCOD-1 through ENCOD-N. As shown, each of encoders 101 are associated with one of encoder buffers 106-1 through 106-N. Each of encoder buffers 106 receives as an input and stores the one of encoded bit-streams ENCOD that was supplied from its associated one of encoders 101. The stored encoded bit-streams ENCOD are supplied from each of encoder buffers 106, in a first in, first out fashion, through multiplexer (mux) switch 108 to multiplex buffer 109 prior to transmission by the channel. Multiplex buffer 109 is typically much larger than each of encoder buffers 106 because it must be able to store data that has been supplied from each of encoder buffers 106.

As shown in FIG. 3, the cost of a large demultiplex buffer prior to demultiplexing can be eliminated by employing independent decoders 208, each of which is associated with their own decoder buffers 205. An even simpler arrangement for an exemplary demultiplexer and decoder is possible, as shown in FIG. 4, if each of decoders 308 is able to have its own packets of data identified and extracted directly from the multiplexed bit-stream 112 by employing packet select units 301. An advantage of employing configurations such as those shown in FIGS. 3 and 4 is that additional decoders can be added, as desired, simply by connecting them to the multiplexed bit-stream 112 or demultiplexed individual encoded incoming data streams.

Each of individual unencoded bit-streams 111 (FIG. 2) is assumed to consist of a sequence of "access units". For example, without limitation, a video access unit could be a video frame containing an image, while an audio access unit could be a block of digitized audio samples.

Access units from unencoded bit-streams 111 are supplied to encoders 101 in which they are encoded and formed into one or more "packets" of data, which form each of signal ENCOD. For clarity of exposition, in this example there is assumed to be one packet per access unit. Other embodiments, included within the scope of the invention, in which the ratio of access units to packets is not unity, will be readily apparent to those skilled in the art. Each encoded packet contains a predetermined number of bits which may vary from packet to packet. The packets are supplied as an input to each of encoder buffers 106.

The starting and ending times of each access unit are supplied from each of encoders 101 as input to each of encoder rate controllers 103 over links 102-1 through 102-N. Similarly, the number of bits generated during the encoding of each access unit are supplied from each of encoders 101 as an input to each of encoder rate controllers 103 over links 102-1 through 102-N. Each of encoder rate controllers 103 monitors the starting and ending times of each access unit and the number of bits generated to encode each access unit. Also, encoder rate controllers 103 supply to multiplex system controller 105, over links 104-1 through 104-N, the starting and ending times of each access unit and the number of bits generated. Multiplex system controller 105 employs the starting and ending times of each access unit and the number of bits generated in a manner described below. Encoder rate controllers 103 also monitor the fullness of buffers 106 in a manner to be described below for use in controlling the bit-rates of signals ENCODE that are supplied as outputs from encoders 101.

Periodically, according to a predetermined system timing to be described, packets that have been stored in encoder buffers 106 are gathered together to form "packs". This gathering is performed under the control of multiplex system controller 105, which commands mux switch 108 via link 107 to pass predetermined packets from predetermined ones of encoder buffers 106 to multiplexer buffer 109. The transfer of packets from encoder buffers 106 to multiplex buffer 109 is assumed to require only a fraction of a pack duration so that a subsequent pack can be coded without undue risk of encoder buffer overflow. The packs comprising the gathered packets are temporarily stored in multiplexer buffer 109 prior to their transmission to the channel.

System timing is maintained by system clock 110 which supplies as an output a continuously increasing time value $\tau$. It is used in several ways that are described below. Time values, i.e., particular values of $\tau$, may also be inserted periodically into multiplexed bit-stream 112 by multiplex buffer 109. These particular values of $\tau$ may be inserted in multiplexed bit-stream 112 at points which are left to the implementor's discretion. For purposes of this example, the particular values of $\tau$ are inserted as a part of the header data of each pack. The purpose of including particular values of $\tau$ in multiplexed bit-stream 112 is to enable a similar system clock in the demultiplexing system, e.g., system clock 212 (FIG. 3) to accurately track system clock 110.

In exemplary demultiplexing and decoding system 200, as depicted in FIG. 3, packets of multiplex data stream 112, which are incoming from the channel, are identified as to which stream they belong to by switch controller 202. The packets are then switched to a corresponding one of decoder buffers 205-1 through 205-N by demultiplexer switch 203. This switching demultiplexes multiplex data stream 112 back into its original separate encoded signals ENCOD, which each comprise packets containing encoded access units. Demultiplexer switch 203 is controlled by switch controller 202 over link 204. The packets remain in decoder buffers 205 until their respective ones of decoders 208-1 through 208-N are ready to decode them. As in the system of FIG. 1, each decoder waits exactly LT seconds after arrival of the first bit of information from channel line 112 before starting to decode. L is a system parameter determined by the implementor, as discussed in connection with FIG. 1, and T is a pack duration described below.

System clock 212 generates clock $\tau$ for decoder 200. Timing information, the insertion of which was discussed above, may also be extracted from multiplex data stream 112 by switch controller 202. When a system time value, i.e., a particular value of $\tau$, arrives in multiplex data stream 112, it is routed by demultiplexer switch 203 to system clock 212 and utilized to reset the system clock to the newly arrived value. Such timing information may be included in the data streams by encoders 101, to be used later by decoders 208 or 308 in further synchronization of audio, video and other data.

In demultiplexer and decoder 300, an alternative exemplary embodiment depicted in FIG. 4, packets of multiplex data stream 112, which are incoming from the channel, are supplied in parallel to packet selectors 301-1 through 301-N. Each of packet selectors 301 identifies which packets are a part of its associated data stream. Each packet so identified is selected and supplied to its associated one of decoder buffers 304 where they are stored awaiting decoding by one of decoders 308-1 through 308-N. In this embodiment, system timing from multiplex data stream 112 is supplied to each of decoders 308. Each of decoders 308 maintains their own independent system time clocks (not shown) that are the same as system clock 212 (FIG. 3).

Since decoder buffers 205 or 304 have only a finite capacity, it is the responsibility of encoder 100 (FIG. 2) to ensure that they do not overflow or underflow. How this is accomplished can be understood in accordance with FIG. 5, which shows an exemplary system timing diagram for the multiplexing operation. System time, $\tau$, is shown along the horizontal axis. Each pack is defined with respect to a "pack duration" T. Thus, pack i corresponds to a system time interval of $[(i-1)T, iT]$. In this embodiment, any access unit that stops, i.e., completes being received by its corresponding one of encoders 101, in system time interval of $[(i-1)T, iT]$ is to be included in pack i. For purposes of this example, N is taken to be 5 so that there are five unencoded data streams 111 which are denominated "a", "b", "c", "d" and "e" as shown. Access units from exemplary streams "a", "b", "c" and "d" are to be included in pack i. In addition, one access unit from stream "e", which is not to be included in pack i because it did not terminate therein, is also shown.

It will be apparent to one skilled in the art that other embodiments within the scope of the invention might choose to define access units as belonging to a pack if the access units begin, i.e., are started to be received by its corresponding one of encoders 101 in system time interval of $[(i-1)T, iT]$, rather than stop there. In such an embodiment, the ends of the access units can be aligned to correspond to the operation and discussion of FIG. 5 through the use of suitable delays placed prior to encoders 111. This will be readily apparent to one skilled in the art.

Pack timing might also be chosen so as to align the pack time with one of the access unit streams, i.e., T would equal the access unit duration of the selected stream. In FIG. 5, stream "a" is chosen as such a "master stream" for purposes of defining pack timing. Packets of data from the encoded access units are multiplexed for transmission one after the other, as shown. There is no special alignment of transmitted packets with pack timing, as seen from FIG. 5.

At system time $\tau = (i-1)T$, all packets from pack i−1 have been multiplexed, and it can be seen that their transmission will finish at a later time, $\tau_{buf}$. At time $(i-1)T$ the packets awaiting transmission are stored in the multiplexer buffer 109 (FIG. 2). If the channel operates at a constant bit-rate $R_m$, then the number of bits stored in multiplexer buffer 109, at time $(i-1)T$, is given by $$[\tau_{buf} - (i-1)T]R_m. \tag{28}$$

This must be kept smaller than the size of multiplexer buffer 109 in order to avoid buffer overflow. It must also be larger than zero (0) to avoid underflow of multiplexer buffer 109.

The overall system delay of a packet, as measured from when the packet is being supplied as an output from one of encoders 106 until the packet is being supplied as an input at one of decoders 208 (FIG. 3) or 308 (FIG. 4) is a fixed predetermined constant, $\tau_{DM} = LT$ that is chosen by the implementor. All of the packets of each stream must be transmitted by the time their respective decoders expect to process them. Otherwise, decoder buffer underflow occurs, i.e., underflow of the one of decoder buffers 205 or 308 for which all the packets were not transmitted.

As described above, each of encoder rate controllers 103 (FIG. 2) maintains a list of start times for all unmultiplexed packets. These start times are also supplied to multiplex system controller 105 via links 104. The minimum value of these start times plus the system delay $\tau_{DM}$ is the latest point in time at which the transmission of the next packet to be multiplexed may finish. If transmission is not finished by this point, the possibility of decoder buffer underflow exists. In FIG. 5, the minimum start time of all the unmultiplexed packets belongs to packet $P_{(i+1)1}^e$ of stream "e". This minimum start time is designated $\tau_{min}$. The decoder for stream "e" expects to decode packet $P_{(i+1)1}^e$ exactly $\tau_{DM}$ seconds later at time $\tau_{max} = \tau_{min} + \tau_{DM}$. Thus, packet $P_{(i+1)1}^e$ as well as any packet multiplexed before it must be transmitted prior to $\tau_{max}$. Since packet $P_{(i+1)1}^e$ belongs to pack $i+1$, all data packets in pack $i$ must be transmitted before $\tau_{max}$.

This requirement to finish transmission is equivalent to placing an upper bound on the quantity of data waiting to be multiplexed, i.e., a limit on the maximum amount of data that can be stored in each of encoder buffers 106 and in multiplex buffer 109. More specifically, the sum of the fullnesses of encoder buffers 106 must not exceed $$[\tau_{max} - \tau_{buf}]R_m \qquad (29)$$

in order to avoid buffer underflow in decoder buffers 205 (FIG. 3) or 304 (FIG. 4).

One method of ensuring that this buffer fullness level is not exceeded is to limit the total amount of buffering capacity in encoding system 100. That is, if the combined capacity of encoder buffers 106 and multiplexer buffer 109 is kept below $\tau_{DM}R_m$, decoder buffer underflow cannot occur. However, if some of unencoded bit-streams 111 are very sporadic, and their corresponding ones of encoder buffers 106 are nearly empty most of the time, placing such a limit on the combined buffer size can be wasteful. Also, if the channel bit-rate is not constant, such a buffer size limitation may be inaccurate and wasteful. Thus, in this exemplary embodiment and in accordance with an aspect of the invention, multiplex system controller 105 monitors the sum of the fullnesses of encoder buffers 106 and multiplexer buffer 109, as described below, so as to ensure that the combined fullness level does not exceed that prescribed by equation (29).

Once an access unit stops, its data packets can be transferred through mux switch 108 from one of encoder buffers 106 to multiplexer buffer 109. As shown in FIG. 5, the first packet to terminate is from stream "d", designated $P_{i1}^d$. If this packet contains $N_{i1}^d$ bits, then after $P_{i1}^d$ is multiplexed, $\tau_{buf}$ must recomputed as follows:

$$\tau_{buf} = \tau_{buf} + (N_{i1}^d / R_m). \qquad (30)$$

If the packet so multiplexed has the earliest starting time $\tau_{min}$ of the unmultiplexed packets, as determined by multiplex system controller 105, then $\tau_{min}$ is reset to the earliest starting time of the remaining unmultiplexed packets and $\tau_{max} = \tau_{min} + \tau_{DM}$. Doing so creates a larger $\tau_{max}$ and additional free space in multiplexer buffer 109. In FIG. 5, packet $P_i^d$ does not have the earliest start time, and therefore, $\tau_{min}$ is not recomputed.

Encoder rate controllers 103 are also responsible for preventing overflow of decoder buffers 204 or 305 in accordance with an aspect of the invention. This capability is desirable to avoid requiring excessively large decoder buffer sizes, which would result in implementing buffer storage that is never used. To this end, each of encoder rate controllers 103 keeps a running count of its corresponding decoder buffer fullness so that it can check if overflow of its associated one of decoder buffers 205 (FIG. 3) or 304 (FIG. 4) is imminent. For example, with regard to stream "a", as shown in FIG. 5, the decoding of pack i is finished on or before system time $(i+L)T$. Moreover, time $\tau_{buf}$ falls within the decoding time of pack $i-2$. Encoder rate control 103-1 computes the fullness of decoder buffer 205-1 or 304-1 at system time $\tau_{buf}$ as described for encoder rate controller 70 (FIG. 1) (eq. (23)). From this, the likelihood of overflow of decoder buffer 205-1 or 304-1 can be determined. In this embodiment, if overflow threatens, encoder 101-1 is simply told to reduce its output data rate.

Other actions are also possible to alleviate overflow of decoder buffer 205-1 or 304-1 and may be employed in other embodiments. For example, the current packet could be terminated and a new one begun with the thought that the new one can be sent at a later time without overflow. Alternatively, packets from other streams could be multiplexed first with the thought that later transmission would be possible without overflow. Or, if there is enough space, stuffing bits could be put into the multiplexer buffer 109 that would be ignored at the decoder demultiplexer, thus giving the decoder buffer time to empty.

Shown in FIG. 6 is a more detailed view of exemplary encoder rate controller 103-1 (FIG. 2). Each of the others of rate controllers 103 are identical in structure but have different suffixes corresponding to their associated access units. Recall that for purposes of clarity of exposition, each of encoders 101 generates only one packet of coded data per access unit. Extension to embodiments where multiple packets are generated per access unit will be obvious to those skilled in the art.

Signals 501-1 through 505-1 are communicated between encoder 101-1 (FIG. 2) and encoder rate controller 103-1 via link 102-1. Also, signals 506-1 through 510-1, 511, 512-1, 513 and 514 are communicated between encoder rate controller 103-1 and multiplex system controller 105 via link 104-1. Encoder 101-1 supplies as an output on line 501-1 a signal indicating the start of a packet, which in turn causes start time FIFO 516 to receive as an input the current value of $\tau$ from system clock 110. Similarly, encoder 101-1 supplies as an output on line 502-1 a signal indicating the stop of a packet, which in turn causes stop time FIFO 517 to receive as an input the current value of $\tau$ from system clock 110. Encoder 101-1 supplies as an output on line 503-1 a running count of the size of the packet currently being coded. At the time a packet stops, this value is entered into packet size FIFO 518. The outputs supplied by start time FIFO 516, stop time FIFO 517 and packet size FIFO 518, which correspond to packets that have been stored in encoder buffer 106-1 but have not yet been multiplexed, are sent to multiplex system controller 105 via lines 506-1, 507-1 and 509-1 respectively.

Encoder 101-1 has the option of reserving space for packets that it will generate in the short term future. This capability is important for bursty sources that typically generate very little information, but can, on occasion, generate a significant amount. The sizes of expected future packets are received as an input from encoder 101-1 on line 504-1 and pass to multiplex system controller 105 via line 510-1.

As each packet is multiplexed, a NEXT PACKET signal from multiplex system controller 105 on line 508-1 causes each of start time FIFO 516, stop time FIFO 517 and, packet size FIFO 518 to present their next stored value, if any, to multiplex system controller 105. If start time FIFO 516 or stop time FIFO 517 are empty, a null output is presented until such time as they are no longer empty. If packet size FIFO 518 is empty, what is being supplied to it as an input is fed directly through it and supplied as an output in order that multiplex system controller 105 can receive the running count of packet size.

Each new packet size from packet size FIFO 518 is also supplied as an input to accumulator 519, which calculates the accumulated sum of the values it has received as inputs. The new packet sizes from packet size FIFO 518 are also supplied as an input to decoder buffer counter 521, which increments its count by the value of the packet size of each packet. Accumulator 519 sums the number of bits in the current pack for its associated stream, stream 111-1 in this example. At the end of each pack, an ENCODER PACK signal is supplied from multiplex system controller 105 on line 513. This causes the accumulated number of bits in the current pack to be supplied as an output from accumulator 519 and received as an input by pack size FIFO 520, which stores the number of bits that comprised previous packs. The ENCODER PACK signal also causes accumulator 519 to clear itself to a value of zero (0).

Decoder buffer counter 521 counts the number of bits that will be stored in a corresponding decoder buffer, e.g., decoder buffer 205-1 (FIG. 3), at time $\tau_{buf}$ (see FIG. 5). As additional packets are multiplexed, counter 521 is incremented by the size of each packet to reflect its transmission over the channel from multiplex buffer 109, as multiplex bit-stream 112, to decoder buffer 205-1. Also, $\tau_{buf}$ is incremented to reflect the transmission times of the packets according to eq. (30).

Periodically, as shown in FIG. 5, $\tau_{buf}$ crosses a decoded pack boundary, thereby indicating that another pack has been read out of decoder buffer 205-1 (FIG. 3) or 308 (FIG. 4) (whichever system is implemented) and into decoder 208-1 or decoder 308-1, respectively. At such a time, multiplex system controller 105 (FIG. 2) generates a DECODER PACK signal that is supplied as an input on encoder rate control line 514. This signal causes a number of bits equal to the size of the decoded pack to be supplied as an output from pack size FIFO 520. Decoder buffer counter 521 is also decremented by the same number, thus tracking the worst case behavior of decoder buffer 205-1. The actual decoder buffer fullness will be smaller than that computed by decoder buffer counter 521, because typical decoders do not usually extract bits from their associated decoder buffer all at once at the end of a pack.

The count from decoder buffer counter 521 is supplied to threshold detect 522, which checks to determine if decoder buffer overflow is imminent. It does this by determining if the decoder buffer fullness value from decoder buffer counter 521 exceeds a predetermined threshold. This predetermined threshold is preset to some fraction of the total buffer capacity. One recommended threshold is 95% of the decoder buffer size, however this threshold is determinable by the implementor. If decoder buffer overflow is imminent, in this illustrative embodiment, a signal is sent to encoder 101-1 via OR gate 524 and line 505-1 instructing encoder 101-1 to reduce the rate at which it is producing bits. However, other alternatives may also be implemented to deal with decoder buffer overflow, as described above.

An indication of the fullness of encoder buffer 106-1, which is received as an input on line 115-1, is supplied to multiplex system controller 105 via line 512 as well as to threshold detector 523. If overflow of encoder buffer 106-1 is imminent, a signal is supplied by threshold detector 523 to encoder 101-1 via OR gate 524 and line 505 instructing encoder 101-1 to reduce the rate at which it is producing bits.

If multiplex system controller 105 determines that the transmission capacity of channel 112 is limited for reasons to be described below, a signal is supplied via line 511, which in turn is supplied to encoder 101-1 via OR gate 524 and line 505-1, instructing encoder 101-1 to reduce the rate at which it is producing bits.

FIG. 7 depicts, in simplified block diagram form, a detailed view of multiplex system controller 105 (FIG. 2). Pack counter 615 determines which pack is being multiplexed and supplies as an output its number i, which is simply $\tau/T$ rounded up to the next integer. Whenever i changes in value, indicating a new pack, pack counter 615 also supplies as an output on line 513 an ENCODER PACK signal, which is sent to all of encoder rate controllers 103.

Packet stop times and packet sizes, as described above, are supplied from each of encoder rate controllers 103 to multiplexer system controller 105 and are received via lines 507 and 509, respectively. As soon as a packet stop time that is within the pack duration $[(i-1)T, iT]$ arrives on one of lines 507, that packet and its associated stream is selected for multiplexing. An identification of the associated stream is then supplied by packet select 612 as an input to switch controller 613, which also reads the corresponding packet size that has been received as an input on one of lines 509. The stream identification and packet size are then supplied to mux switch 108 via link 107, thus enabling mux switch 108 to position itself correctly and pass the correct number of bits from the corresponding one of encoder buffers 106 to multiplex buffer 109. Thereafter, packet select 612 transmits a NEXT PKT signal to the above identified one of encoder rate controllers 103 via one of lines 508. This causes parameters for a new packet to be supplied from the identified one of encoder rate controllers 103.

Packet start times, determined as described above, are supplied from each of encoder rate controllers 103 via lines 506. The minimum value of the received packet start times $\tau_{min}$ is found by find minimum circuit 619 and that minimum value is supplied to compute $\tau_{max}$ module 616. Also, each of encoder rate controllers 103, as described above, transmit their RESERVATION REQUESTS to multiplex system controller 105. The RESERVATION REQUESTS are received as inputs via lines 504 by compute $\tau_{max}$ module 616.

Compute $\tau_{max}$ module 616 adds the values of the bit-rates requested in each reservation requests, expressed in bits, and then divides the total by channel bit-rate $R_m$ to convert the total bit-rate request into a time value $\tau_{res}$. $\tau_{max}$, as shown in FIG. 5, is then computed by $$\tau_{max} = \tau_{min} + LT - \tau_{res}. \quad (31)$$

An indication of the fullness of multiplex buffer 109 is received via line 114 (FIG. 2) and is divided by channel bit-rate $R_m$, by divider 620, to convert the fullness indication to an equivalent time value $\tau_{buf}$. $\tau_{buf}$ is thus the time that will be required to transmit the bits stored in multiplex buffer 109. $\tau_{buf}$ is then supplied to generate decoder pack signal module 614 and compute available capacity module 617.

The values of indications of the fullness of encoder buffers 106, expressed in bits, are supplied to multiplex system controller 105 via lines 512 and are totalled by adder 620, which supplies their sum $SUM_{encbuf}$ to compute available capacity module 617. The available capacity, expressed in bits, is determined by $$C_{avail} = (\tau_{max} - \tau_{buf})R_m - SUM_{encbuf}. \quad (32)$$

in compute available capacity module 617.

In some implementations, one of encoder buffers 106 may be made larger than described here in order to add some desired delay. For example, an audio access unit would normally have to be delayed considerably prior to its encoding so as to be matched up with its corresponding video access unit as described above. Under such circumstances, it may be more economical to delay the encoded compressed audio signal by simply providing it with a larger one of encoder buffers 106. A side effect of doing so is that the resulting encoder buffer fullness is much larger than it would be otherwise. Therefore, in such an embodiment, the values of indications of the fullness of encoder buffers 106 from lines 115 or 512 can be replaced by the corresponding packet size value from the corresponding one of encoder rate controllers 103 that are received as inputs via one of lines 509. In fact, replacing all of the values of indications of the fullness of encoder buffers 106 received from lines 512 with their corresponding packet sizes on line 509 will not affect performance of encoder system 100 very much.

$C_{avail}$ is supplied to threshold detector 618, which checks to determine if available capacity is too low by determining if the available capacity is below a predetermined threshold that is set to some fraction, e.g, 5%, of maximum $\tau_{DM}R_m$. If it is, a REDUCE BIT-RATE signal is transmitted via line 606 to all of encoder rate controllers 103 to instruct them to lower their generated bit-rates.

Generate decoder pack signal module 614 supplies a DECODER PACK signal via line 514 to all of encoder rate controllers 103 whenever $\tau_{buf}$ crosses a decoded pack boundary, as described above. The decoder pack boundary is the decoder version of the end of the pack duration. It is the latest time that any packet of the pack will be decoded by its respective decoder and therefore can be used by decoder buffer counter 521 in FIG. 6 to compute an upper bound on decoder buffer fullness. The decoded pack number j is simply $\tau_{buf}/T$ rounded up to the next integer. Whenever j changes in value, indicating a new decoded pack has been taken from the decoder buffers, a DECODER PACK signal is generated.

The embodiment described hereinabove assumes that multiplex buffer 109 is large, e.g., able to hold L packets from all streams, relative to each of encoder buffers 106 which typically hold only one pack from one stream. However, such a basic multiplexing methodology is valid for other arrangements as well, including large encoder buffers 103 and a small or nonexistent multiplexing buffer 109. In such an arrangement, mux switch 108 output will have limited bandwidth and cannot empty encoder buffers 106 in less than the pack duration, which as was assumed heretofore. Thus, encoder buffers 106 will hold not only packets that have not been multiplexed, but also packets that have been multiplexed and are awaiting transmission. This implies that multiplex requests from multiplex system controller 105 to multiplex switch 108 will have to be queued by multiplex switch 108. Moreover, indications of the fullness of multiplex buffer 109 will have to be replaced by a sum of the queued packet sizes. Also, since encoder buffers 106 in such an embodiment hold more than unmultiplexed packets, the encoder buffer fullnesses received via lines 512 (as shown in FIG. 7) should be replaced by the same packet sizes as are received via lines 509.

It is noted that video signals have been used herein in an exemplary fashion and that the scope of then invention does not require that video signals actually be at least one of the signals encoded and transmitted over the variable bit-rate channel. Any signals capable of being divided into units and encoded may be employed within the scope of the invention.

We claim:

1. A method for controlling at least one variable rate encoder which is receiving a signal as an input and is adapted for supplying a variable bit-rate encoded version of said signal as an output via an encoder buffer to a channel having an variable transmission rate for said encoded output, said channel transporting said encoded version of said signal to at least one decoder via an at least one decoder buffer, comprising the steps of:

monitoring a fullness indication of said at least one encoder buffer;
   monitoring a fullness indication of said at least one decoder buffer;
   developing estimates for a plurality of future transmission capacity for said channel;
   making a request to said channel for a current transmission capacity;
   making a determination as to an actual transmission capacity made available by said channel in responce to said request;
   developing at least one control signal, in response to said estimates of future transmission rates, said request, said fullness indication of said at least one encoder buffer and said fullness indication of said at least one decoder buffer for controlling said variable bit-rate of said encoded version of said signal supplied by said at least one variable rate encoder such that overflow or underflow of at least one encoder buffer and at least one decoder buffer is avoided.

2. The method as defined in claim 1 wherein said at least one control signal specifies at least one range of acceptable bit-rates that can be supplied by said at least one variable rate encoder.

3. Apparatus in an encoder unit for encoding an original video signal including frames, wherein each frame contains at least one image representation, and for supplying as an output for transmission, to a variable bit-rate channel, an encoded version of said original video signal including encoded frames containing at least one encoded image representation, the variable bit-rate channel being adapted for supplying said encoded version of said original video signal to a remote decoder unit including at least one decoder buffer for storing the encoded version of the original video signal and at least one video decoder for generating a reconstructed version of the original video signal, the apparatus comprising:

means for encoding each of said frames of said original video signal into a first encoded version in which each frame of said original video signal is represented by a plurality of bits, the actual number of said bits for each frame being within a predetermined range, each of said first encoded frames being supplied as an output as a first encoded version of said original video signal;

encoder buffer means for storing said first encoded version of said original video signal and for supplying as an output each frame of said first encoded version of said original video signal;

means for generating a second encoded frame for each frame of said first encoded version of said original video signal by removing therefrom a predetermined number of bits and supplying said second encoded version of each frame of said original video signal as said encoded version of said original video signal comprising encoded frames for transmission;

means for generating bit-rate requests for a current frame to be supplied to said channel;

means for generating a set of estimated transmission rates that are expected to be supplied by said channel for a predetermined number of future frames of said encoded version of said original video signal;

means, responsive to an actual number of bits within at least one frame of said first encoded version of said original video signal and said set of estimated transmission rates, for developing said range such that overflow or underflow of said encoder buffer means and said at least one decoder buffer is avoided.

4. The apparatus as defined in claim 3 wherein said means for requesting from said channel a transmission rate for transmitting a current frame is responsive to said actual number of bits within at least one frame of said first encoded version of said original video signal and at least one transmission rate granted by said channel.

5. The apparatus as defined in claim 3 wherein said means for generating said set of estimated transmission rates is responsive to said actual number of bits within at least one frame of said first encoded version of said original video signal and at least one transmission rate granted by said channel.

6. Apparatus for use in an encoder unit that encodes a plurality of signals each of which includes access units, each of said access units contains at least a predetermined amount of information and each signal of said plurality of signals is independent of any other signal in said plurality, said encoder unit supplying as an output for transmission, to a fixed bit-rate channel, an encoded version of each signal of said plurality in a multiplexed format, said channel adapted for supplying said encoded versions of said signals in said multiplexed format to a decoder unit including at least one decoder buffer for temporarily storing at least one of said encoded versions of said plurality of signals and at least one video decoder for generating a reconstructed version of at least one of said plurality of signals from said at least one temporarily stored signal, said apparatus comprising:

a plurality of means for encoding each access unit of each signal of said plurality into at least one packet, each access unit being represented in said packets by a plurality of bits, the actual number of said bits employed for representing a particular access unit being within a predetermined range for the particular signal of said plurality which includes the particular access unit, each of said packets being supplied as an output and each one of said means for encoding being dedicated to a particular signal of said plurality of signals;

a plurality of buffer means, each for receiving, temporarily storing and supplying as an output packets supplied from one of said means for encoding;

multiplexing means for combining, in multiplexed fashion, packets supplied as outputs from said plurality of buffer means;

buffer means for receiving, temporarily storing and supplying as an output to said fixed bit-rate channel said packets combined in multiplexed fashion; and controller means for specifying for each of said means for encoding said predetermined range and for coordinating and controlling said multiplexer means such that overflow or underflow of any of said buffer means that temporarily store any representation of said access units in said encoder or said decoder is avoided.

* * * * *